US005500141A

United States Patent [19]

Kormann et al.

[11] Patent Number: 5,500,141

[45] **Date of Patent: *Mar. 19, 1996**

[54] MAGNETIC INK CONCENTRATE

[75] Inventors: Claudius Kormann, Schifferstadt; Ekkehard Schwab, Neustadt; Friedrich-Wilhelm Raulfs, Limburgerhof; Karin H. Beck, Ludwigshafen, all of Germany

[73] Assignee: BASF Aktiengesellschaft, Ludwigshafen, Germany

[ * ] Notice: The term of this patent shall not extend beyond the expiration date of Pat. No. 5,250,207.

[21] Appl. No.: 304,821

[22] Filed: Sep. 13, 1994

Related U.S. Application Data

[60] Continuation of Ser. No. 79,876, Jun. 23, 1993, abandoned, which is a division of Ser. No. 879,011, May 6, 1992, Pat. No. 5,250,207.

[30] Foreign Application Priority Data

May 14, 1991 [DE] Germany .......................... 41 15 608.0

[51] Int. Cl.$^{6}$ ................................ H01F 1/00; H01F 1/26; C09D 11/00

[52] U.S. Cl. ................................ 252/62.54; 252/62.51 R; 252/62.56; 106/20 B

[58] Field of Search .............................. 252/62.56, 62.51, 252/62.54; 106/20 B

[56] References Cited

U.S. PATENT DOCUMENTS

| | | | |
|---|---|---|---|
| 3,228,881 | 1/1966 | Thomas | 252/62.54 |
| 3,965,032 | 6/1976 | Gibbs et al. | 252/306 |
| 3,990,981 | 11/1976 | Kovac et al. | 252/62.54 |
| 4,026,713 | 5/1977 | Sambucetti et al. | 252/62.56 |
| 4,107,063 | 8/1978 | Kovac et al. | 252/62.52 |
| 4,493,778 | 1/1985 | Iqbal | 252/62.54 |
| 4,810,401 | 3/1989 | Mair et al. | 252/62.56 |
| 4,824,587 | 4/1989 | Kwon et al. | 252/62.55 |
| 5,240,626 | 8/1993 | Thakur et al. | 252/62.54 |

*Primary Examiner*—C. Melissa Bonner
*Attorney, Agent, or Firm*—Keil & Weinkauf

[57] ABSTRACT

A magnetic ink concentrate essentially consisting of a dispersion of superparamagnetic solid particles in water or alcohol in the presence of a dispersant, and a process for its preparation.

2 Claims, No Drawings

MAGNETIC INK CONCENTRATE

This application is a continuation of application Ser. No. 08/079,876, filed on Jun. 23, 1993, now abandoned, which is a division of Ser. No. 07/879,011 filed May 6, 1992, now U.S. Pat. No. 5,250,207.

The present invention relates to a magnetic ink concentrate, essentially consisting of a dispersion of superparamagnetic solid particles in water or alcohol in the presence of a dispersant, and a process for its preparation.

Magnetic inks in the form of dispersions of magnetizable particles, eg. iron oxides, which are stabilized by the addition of dispersants in solvents, have long been known. As early a publication as British Patent 1,199,961 describes an ink of from 15 to 45% by weight of iron oxide powder dispersed with from 8 to 12% by weight of a copolymer of vinyl acetate and vinyl chloride. For use in inkjet printers, however, it is necessary to have extremely finely divided, non-agglomerating pigments, which are advantageously obtained by precipitation reactions. Well defined magnetic properties, such as high saturation magnetization and high susceptibility of the prepared inks in conjunction with low viscosity, are also important. The inks must furthermore be stable to sedimentation.

DE-A 26 23 508 describes magnetic inks based on precipitated magnetite and surfactants, such as aliphatic carboxylic acids, which necessitate the admixture of a number of further components for suppressing the troublesome foam effect and for dispersion in water. A disadvantage here is that the unsaturated carboxylic acids are sensitive to oxidation and lead to an unpleasant odor annoyance during preparation and use. Moreover, the stated process requires wash operations in which these substances with an unpleasant odor also enter the wastewater. Similar problems also occur in a process according to DE-A 28 08 144. Furthermore, owing to the choice of the dispersants, no sulfates must be present during the precipitation of the magnetic iron oxides in this process, since sulfates adversely affect the adhesion of the surfactants to the pigment. Thus, the iron(II) sulfate obtained as a byproduct in the production of titanium dioxide is an advantageous raw material but cannot be used here. In addition, the dispersants used in this process result in the ink giving an unclear text image on paper and having too high a viscosity.

Apart from a sufficiently low viscosity, inks of this type must also have a high magnetic moment. However, these two properties are opposite ones for a given system. By controlled doping of iron oxides with Mn and Zn ions, it is possible to achieve higher specific saturation magnetization and susceptibility so that the solids content can be reduced while the magnetic properties of the inks are kept constant, with the result that a lower viscosity is possible (EP-A 67 687). In addition to the viscosity and magnetization, the stability of the dispersion is another important property of the magnetic inks. As in the case of, for example, oleic acid, the alkylsulfonates predominantly used as dispersants give poorly reproducible results owing to agglomeration phenomena and foaming.

It is an object of the present invention to provide an aqueous dispersion of magnetic particles which is stable to sedimentation, is suitable for use in writing apparatuses, for example inkjet printers, based on the action of capillary forces, does not have the abovementioned disadvantages and possesses optimum magnetic properties in conjunction with a low viscosity.

We have found that this object is achieved by a magnetic ink concentrate, consisting essentially of a dispersion of superparamagnetic solid particles in water or alcohol in the presence of a dispersant, wherein the dispersant consists of at least one polyelectrolyte having a molecular weight of from 1,000 to 25,000 and selected from the group consisting of polyacrylate, acrylic acid/acrylamide copolymers and polyvinylphosphonic acid and the alkali metal salts of these compounds, with the proviso that the ink concentrate has a viscosity of less than 10 cP, measured at 22° C., and a saturation magnetization of > 32 mT.

Superparamagnetic solid particles incorporated into the novel ink concentrate are advantageously those which have a BET specific surface area of from 60 to 130, preferably from 80 to 110, $m^2/g$. The specific surface area was determined here according to DIN 66,132 by means of a Ströhlein areameter from Ströhlein, Düsseldorf, by the one-point difference method according to Haul and Dümbgen. They are, in particular, superparamagnetic solid particles which are of the general formula $M_vMn_wZn_xFe_yO_z$, where M is Co and/or Ni, v and w are each from 0 to 0.998, x is from 0.001 to 0.998, y is from 2.001 to 2.998, z is from 3.001 to 4, v+ w+ x is from 0.002 to 0.999, v+ w+ x+ y is 3, v+ 0, if W= 0 and w+ 0 if V= 0, and as described in U.S. Pat. No. 4,810,401.

The conventional carriers, such as water or alcohols, are used as carriers for the novel ink concentrates. Examples of alcohols are ethylene glycol, diethylene glycol and glycerol, and mixtures of these alcohols with water are also included.

The polyelectrolytes which are typical for the novel ink concentrates and have a molecular weight of from 1,000 to 25,000, in particular from 1,500 to 20,000, preferably about 4,000, are polyacrylic acid, acrylic acid/acrylamide copolymers and polyvinylphosphonic acid.

The added amount of these substances is based on the specific surface area of the superparamagnetic particles and is not less than 0.7 mg per $m^2$ of BET surface area, and amounts of from 1.5 to 5 $mg/m^2$ have proven particularly advantageous.

In addition to these components, the novel magnetic ink concentrates may also contain additives for regulating the flow behavior, for example alkyl phenolates. It is also possible to add high boilers, such as diethylene glycol, ethylene glycol, glycerol and polyethylene glycol in minor amounts for establishing advantageous flow and drying properties. By adding dyes, it is also possible to vary the depth of the ink concentrates, provided that a certain reduction in the saturation magnetization does not present problems.

These novel magnetic inks can be prepared in a simple manner. For this purpose, a mixture of water or alcohol and the polyelectrolyte and/or its alkali metal salt in the form of a 10–90% strength by weight solution is stirred with the usually still moist filter cake of the superparamagnetic material, and the suspension is then dispersed for from half an hour to 2 hours under the action of high shear forces. The temperature may increase to 70° C. during this procedure. The components may be added in any order, and the order of addition has no effect on the properties of the resulting ink concentrate. Centrifuging is then carried out for from 10 minutes to 2 hours at from 200 to 2,000 g, and the small amount of sedimented particles is separated off. The resulting product corresponds to the novel magnetic ink concentrate in composition and properties.

In its property profile, the novel ink concentrate is substantially improved compared with prior art ink concentrates. For example, it is particularly stable to sedimentation, ie. the concentration of the dye at the bottom of a liquid column which is, for example, 10 cm high increases after storage for one week by less than 3% compared with the mean concentration. Another advantageous property is the very high saturation magnetization of > 32 mT in spite of the low viscosity of the novel ink concentrate of < 10 cP. Furthermore, the ink concentrate neither foams nor ever forms lumps during handling. Another advantage which is particularly evident when the ink concentrate is used is its freedom from odor. It is therefore very useful as a magnetic ink for writing apparatuses, for example inkjet printers. The resulting text image is crisp, not blurred and mar-resistant. The novel magnetic ink concentrate can also be used for information storage by means of a magnetic bar code since the high magnetic susceptibility makes it particularly suitable for this purpose.

The Examples which follow illustrate the invention without restricting it.

EXAMPLE 1

A solution of 542.3 g of iron(III) chloride hexahydrate, 187.7 g of iron(II) chloride dihydrate, 32.2 g of zinc chloride and 70.0 g of manganese chloride tetrahydrate in 1,100 ml of water, containing 15 ml of added concentrated hydrochloric acid, is added dropwise at from 22° to 30° C. to a solution of 370 g of sodium hydroxide in 370 ml of water. After precipitation is complete, a pH of 10.4 is measured. The mixture is heated to 70°–75° C., kept at this temperature for 1 hour and cooled to room temperature, and the pH is then brought to 9. The resulting ferrite suspension is filtered off and washed chloride-free. The manganese zinc ferrite ($Mn_{0.3}Zn_{0.2}Fe_{2.5}O_4$) thus obtained has the following characteristics after drying at 80° C.: specific surface area $S_{N2}$= 106 $m^2/g$, magnetization $M_m/_\rho$=80 $nTm^3/g$.

EXAMPLE 2

A mixture of 54 g of the sodium salt of a polyacrylic acid having a molecular weight of 4,000 and a degree of neutralization of 85% and 66 ml of water are stirred with the moist filter cake of the manganese zinc ferrite prepared according to Example 1 (dry weight 275 g), a low-viscosity suspension being formed. This suspension is then dispersed for one hour under the action of high shear forces using an Ultra Turrax dispersing apparatus. Centrifuging is then carried out for one hour at 1,000 g, a small amount of particles which readily settle out being separated off. A suspension which is stable to sedimentation, can be used in an inkjet printer and has the following properties remains: saturation magnetization 33.5 mT; sediment formation on the bottom of a 10 cm high suspension column after one week: <2%; viscosity (measured with a Carrimed CS 100 rheometer with shearing stress control) 5 cSt, corresponding to 7.2 cP.

EXAMPLE 3

A manganese zinc ferrite is prepared as described in Example 1, except that 262.5 g of $Fe_2SO_4.7H_2O$ are used instead of the iron(II) chloride. 27.5 g of this ferrite, in the form of a moist filter cake, are dispersed with 5.5 g of the polyacrylic acid according to Example 2 in 6.7 g of water. Further working up is carried out as described in Example 2. The resulting ink concentrate forms <2% of sediment and has a saturation magnetization of 40 mT and a viscosity of 9 cP.

EXAMPLE 4

4 g of a dispersant consisting of a copolymer of acrylic acid and acrylamide in a ratio of 80:20 and having a K value of 17.9 are added to a part of the washed filter cake prepared according to Example 1 and having a ferrite content of 20 g, the pH is brought to 10 and the mixture is dispersed for half an hour under the action of high shear forces. Components which readily settle out are then separated off by centrifuging for one hour at 1,000 g. No sediment formation is measurable after storage of a 10 cm high column for one week.

EXAMPLE 5

The procedure described in Example 4 is followed, except that the dispersant used is a copolymer of acrylic acid and acrylamide in a ratio of 90:10, having a K value of 17.3. No sediment formation is measurable after storage for one week.

EXAMPLE 6

The procedure described in Example 4 is followed, except that the dispersant used is a polyvinylphosphonic acid having an average molecular weight of 5,000. No sediment formation is measurable after storage for one week.

EXAMPLE 7

For the preparation of a magnetic ink in alcohol, 240 g of ethylene glycol are added to the washed, moist filter cake according to Example 1, which consists of 138 g of ferrite and 148 g of water. The water is removed at 100° C. under reduced pressure. A suspension is formed which contains only 10% of water and is dispersed after the addition of 19 g of polyacrylic acid/polyacrylate. This suspension is stable to sedimentation and has a saturation magnetization of 35.3 mT. It is suitable as a magnetic ink.

COMPARATIVE EXPERIMENT 1

5.6 g of oleic acid are added to parts of the washed moist filter cake prepared according to Example 1 and consisting of 38 g of ferrite in 112 g of water. The formation of a viscous, lumpy mass is observed, which becomes only slightly less viscous after the addition of alkali (pH increases from 6.6 to 10). The suspension prepared in this manner is striking due to its unpleasant rancid odor and is unsuitable as an ink, also because of its inhomogeneity.

Only after the addition of a mixture of 3 parts of glycerol, 4 parts of polyethylene glycol (molecular weight about 200) and 5 parts of an alkyl phenolate (having a side chain of 6 molecules of ethylene oxide) per 88 parts of suspension is a homogeneous mixture obtained. This magnetic liquid has a viscosity of 24 cP in conjunction with a saturation magnetization of 15.5 mT. In writing tests, blurring of the text occurs on the paper, making the liquid unsuitable for fine text patterns.

COMPARATIVE EXPERIMENT 2

Instead of the amount of oleic acid stated in Comparative Experiment 1, 11.2 g are used. The resulting lumpy mass cannot be further liquefied even after the addition of polyethylene glycol, glycerol and alkyl phenolate, and the mixture formed remains useless as an ink.

EXAMPLE 8

A suspension of the ferrite is dispersed with polyacrylate and made finer by centrifuging, these steps being carried out as in Example 2. The addition of an aqueous solution (content: 30% by weight) of a black sulfonic acid dye (BASACID black X 34 from BASF) results in the formation of 586 g of a magnetic ink having the following composition: 20% by weight of $Mn_{0.3}Zn_{0.2}Fe_{2.5}O_4$, 4% by weight of polyacrylate and 7% by weight of dye. The pH is neutral to slightly alkaline. At a saturation magnetization of 17 mT, the viscosity is 8.8 cP. The resulting magnetic ink possesses a particularly dark color when used for printing with an inkjet printer.

We claim:

1. A magnetic ink concentrate, consisting essentially of a dispersion of superparamagnetic solid particles in water or alcohol in the presence of a dispersant, wherein the dispersant consists of at least one polyelectrolyte having a molecular weight of from 1,000 to 25,000 and selected from the group consisting of polyacrylate, acrylic acid/acrylamide copolymers and polyvinylphosphonic acid and the alkali metal salts of these compounds, said solid particles having a formula $M_vMn_wZn_xFe_yO_z$, where M is Co and/or Ni, v and w are each from 0 to 0.998, x is from 0.001 to 0.998, y is from 2.001 to 2.998, z is from 3.001 to 4, v+ w+ x is from 0.002 to 0.999, v+ w+x+ y is 3, v+ 0, if W= 0 and w+ if V= o, with the proviso that the ink concentrate has a viscosity of < 10 cP, measured at 22° C., and a saturation magnetization of >32 mT.

2. A magnetic ink concentrate as defined in claim 1, wherein the superparamagnetic solid particles have a BET specific surface area of from 60 to 130 $m^2/g$, and the concentration of the dispersant is not less than 0.7 mg per $m^2$ of specific surface area of the superparamagnetic solid particles.

* * * * *